(12) United States Patent
DeMaio et al.

(10) Patent No.: US 7,818,608 B2
(45) Date of Patent: Oct. 19, 2010

(54) SYSTEM AND METHOD FOR USING A FILE SYSTEM TO AUTOMATICALLY BACKUP A FILE AS A GENERATIONAL FILE

(75) Inventors: Pasquale DeMaio, Bellevue, WA (US); Thomas G. Phillips, Bellevue, WA (US); William J. Westerinen, Issaquah, WA (US); Justin Maguire, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 812 days.

(21) Appl. No.: 11/061,767

(22) Filed: Feb. 18, 2005

(65) Prior Publication Data

US 2006/0190505 A1 Aug. 24, 2006

(51) Int. Cl.
*G06F 11/00* (2006.01)
(52) U.S. Cl. .................... 714/6; 714/5; 707/204
(58) Field of Classification Search .......... 714/6, 714/5; 707/204
See application file for complete search history.

(56) References Cited

U.S. PATENT DOCUMENTS

| | | | | |
|---|---|---|---|---|
| 5,778,365 | A * | 7/1998 | Nishiyama | 707/9 |
| 6,119,208 | A * | 9/2000 | White et al. | 711/162 |
| 6,154,852 | A * | 11/2000 | Amundson et al. | 714/5 |
| 6,611,850 | B1 | 8/2003 | Shen | |
| 6,611,863 | B1 * | 8/2003 | Banginwar | 709/220 |
| 6,813,682 | B2 * | 11/2004 | Bress et al. | 711/112 |
| 6,847,984 | B1 * | 1/2005 | Midgley et al. | 707/204 |
| 6,993,603 | B2 * | 1/2006 | Pudipeddi et al. | 710/54 |
| 7,003,702 | B2 * | 2/2006 | Budd et al. | 714/52 |
| 7,024,531 | B2 * | 4/2006 | Saika | 711/162 |
| 7,035,850 | B2 * | 4/2006 | Arai et al. | 707/6 |
| 7,225,208 | B2 * | 5/2007 | Midgley et al. | 1/1 |
| 7,246,140 | B2 * | 7/2007 | Therrien et al. | 707/202 |
| 7,370,234 | B2 * | 5/2008 | Stakutis et al. | 714/15 |
| 7,421,560 | B2 * | 9/2008 | Thind et al. | 711/170 |
| 7,596,703 | B2 * | 9/2009 | Kohiyama et al. | 713/193 |
| 2002/0056031 | A1 * | 5/2002 | Skiba et al. | 711/162 |
| 2002/0078295 | A1 * | 6/2002 | Shaath et al. | 711/112 |
| 2003/0105734 | A1 * | 6/2003 | Hitchen et al. | 707/1 |

(Continued)

FOREIGN PATENT DOCUMENTS

EP 0838758 4/1998

(Continued)

*Primary Examiner*—Scott T. Baderman
*Assistant Examiner*—Loan Truong
(74) *Attorney, Agent, or Firm*—Workman Nydegger

(57) ABSTRACT

An improved system and method for using a file system to automatically backup a file in persistent storage is provided. A storage aggregator may organize nonvolatile memory for use in aggregate to store backup copies of a file. A file system filter driver may receive a request from an application for storing a file and may access a policy to determining whether to create a backup copy of the file and what type of backup to apply to the file. A generational file handler may create and manage a set of generational files as backup copies of a particular application file. And a recovery user interface may be provided to retrieve one or more backup copies, such as the set of generational files, for inspection by a user to recover whatever copy of the file may be desired by the user.

20 Claims, 6 Drawing Sheets

U.S. PATENT DOCUMENTS

| | | | |
|---|---|---|---|
| 2003/0140070 A1* | 7/2003 | Kaczmarski et al. | 707/204 |
| 2003/0156207 A1* | 8/2003 | Kalinski | 348/231.1 |
| 2003/0177435 A1* | 9/2003 | Budd et al. | 714/776 |
| 2004/0088331 A1* | 5/2004 | Therrien et al. | 707/200 |
| 2004/0093361 A1* | 5/2004 | Therrien et al. | 707/204 |
| 2004/0107357 A1* | 6/2004 | Jeon et al. | 713/200 |
| 2004/0111389 A1* | 6/2004 | Pudipeddi et al. | 707/1 |
| 2004/0117344 A1* | 6/2004 | Yang | 707/1 |
| 2006/0053332 A1* | 3/2006 | Uhlmann et al. | 714/2 |
| 2006/0117048 A1* | 6/2006 | Thind et al. | 707/101 |

FOREIGN PATENT DOCUMENTS

| | | |
|---|---|---|
| WO | WO9912098 | 3/1999 |

* cited by examiner

SYSTEM AND METHOD FOR USING A FILE SYSTEM TO AUTOMATICALLY BACKUP A FILE AS A GENERATIONAL FILE

FIELD OF THE INVENTION

The invention relates generally to computer systems, and more particularly to an improved system and method for using a file system to automatically backup a file in persistent storage.

BACKGROUND OF THE INVENTION

Computer users often store important information on their computers that may be critical for accomplishing their tasks. Unfortunately, many computer users suffer a loss of important information for many different reasons, including hardware failure, software failure, and simple errors in operating an application. For example, a computer user may make several changes in a document and intend to save the changed document with a new file name. However, the computer user may make a common error by saving the document under the existing file name and fail to save the file as a document with another name, resulting in the original file being overwritten. By creating backups of their files, computer users may, however, recover from such namespace collisions that may occur in saving changed documents. Even then, an existing application that may use a flat namespace may fail to save incremental copies of files as they are backed up.

Although computer users may avoid a loss of important information by creating backups of their data, computer users can be discouraged by the challenges involved in backing up their data on their computers. One challenge is that the burden is typically placed upon computer users to initiate a backup of their data. In order to do so, computer users may be required to specify where their data is to be backed-up. For example, a computer user may choose to back up data either on the same media as the original data is stored, which may create a risk if the media becomes damaged, or a computer user may choose another location which may require a computer user to knowingly attach or connect to that media. If a backup may be made to media that may be attached or connected to a computer, the backup may not later be available if the media is no longer attached or connected. Another challenge is that a computer user may be required to manage multiple versions of the backup or risk overwriting previously backed up data with corrupted or incorrect data, thus unknowingly destroying a valid backup that may be needed. Moreover, if the computer user runs out of space in the backup media, either space may be created by deleting files or another backup media with adequate space may be chosen, further complicating the process. When the backup may need to be used, it may be difficult for the computer user to locate or access the backup media. This can be particularly difficult, if the backup was on local media, for example, requiring the local media to be moved to a new computer.

Given these challenges, computer users may fail to back up their data as often as they should. What is needed is a way for a computer system to automatically backup files without requiring user intervention. Such a system and method should provide a backup copy of each saved file so that a computer user may be able to recover whatever copy of the file may be desired by the user.

SUMMARY OF THE INVENTION

Briefly, the present invention provides an improved system and method for using a file system to automatically backup a file in persistent storage. To this end, one or more applications may be operably coupled to a policy engine and an operating system that may include a file system operably coupled to one or more devices that may have accessible persistent storage. In one embodiment, the operating system may include operably coupled components such as a volume manager, a file system filter driver, a file system, a storage aggregator, a storage class driver, and one or more miniport drivers operably coupled to one or more devices having persistent storage.

In various embodiments, the file system filter driver may receive a request from executable software code for persistently storing a file and may access a policy provided by the policy engine in order to determining whether to create a backup copy of the file, what type of backup to apply to the file, and where to store the backup copy. The file system filter driver may, for example, instruct the file system to store a backup copy of the file either in embedded nonvolatile memory, in removable nonvolatile memory, in a computer storage medium such as a hard drive, or in a combination of nonvolatile memory and/or other computer storage media including remote storage on a connected network. Moreover, the file system filter driver may include a generational file handler that may be used to create and manage a set of generational files as backup copies of a particular application file.

A storage aggregator may be operably coupled to the file system for enumerating and organizing persistent storage available in the computer system that may be used in aggregate for storing backup copies of the file. The storage aggregator may include a storage enumerator that may identify available persistent storage that may be used by the file system for storing a backup copy of an application file. In one embodiment, persistent storage that may be available in the computer system may be used in aggregate as a volume of a file system for storing backup files on one or more physical devices that may deploy any number of storage techniques including mirroring, striping, or may be configured using RAID or SAN.

Once a backup copy of an application file may be created and persistently stored by the file system, a user interface may be provided for recovering one or more backup copies of the application file in the event of loss or corruption of the application file. A generic tool, such as recovery utility, may be provided in an embodiment for recovery of backed up files. In another embodiment, a recovery user interface operably coupled to an application, may be provided to retrieve one or more backup copies, such as the set of generational files, for inspection by a user to recover whatever copy of the file may be desired by the user.

Advantageously, accessible persistent storage that may be added to various components of a computer system may be used in aggregate for storing backup copies of files automatically created by the file system without user intervention. Moreover, a set of generational files may be stored as backup copies for inspection by a user to recover whatever copy of the file may be desired by the user. Other advantages will become apparent from the following detailed description when taken in conjunction with the drawings, in which:

DETAILED DESCRIPTION

Exemplary Operating Environment

Figure 1:
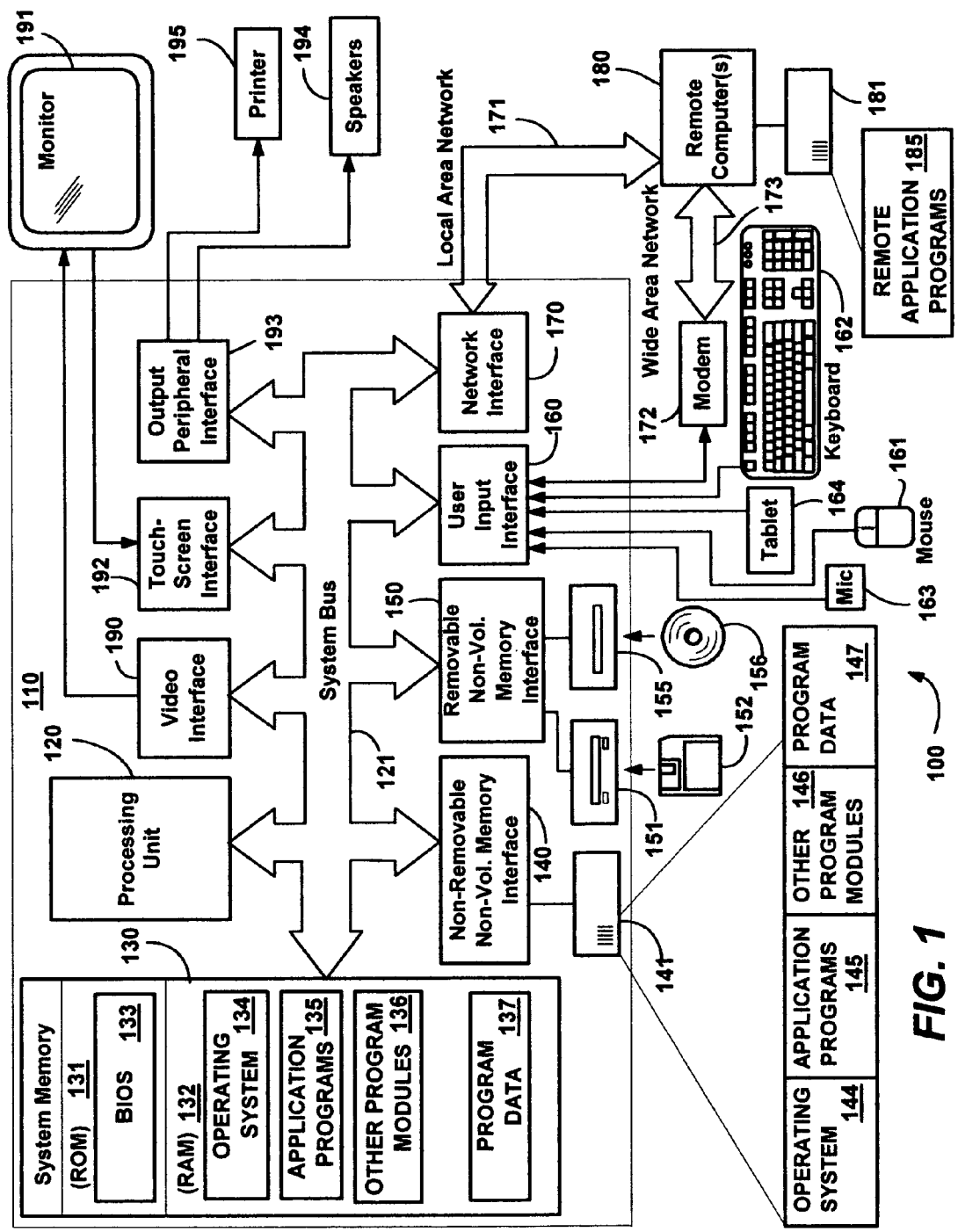
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like connected to the system bus 121 via touch screen interface 192. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Using a File System to Automatically Backup a File in Persistent Storage

The present invention is generally directed towards a system and method for using a file system to automatically backup a file in persistent storage. The system and method may advantageously make a backup copy of a file without requiring user intervention. To do so, the present invention may provide a file system filter driver to receive a request from an application for saving a file and may access a policy to determining whether to create a backup copy of the file, what type of backup to apply to the file, and where to store the backup copy. The file system filter driver may, for example, instruct the file system to store a backup copy of the file either in embedded nonvolatile memory, in removable nonvolatile memory, in a computer storage medium such as a hard drive, or in a combination of nonvolatile memory and/or other computer storage media including remote storage on a connected network.

Moreover, the file system filter driver may include a generational file handler that may be used to create and manage a set of generational files as backup copies of a particular application file. By creating a set of generational files, a backup copy may be made when an application file may be saved so that a computer user may be able to recover whatever copy of the file may be desired by the user. As will be seen, accessible persistent storage that may be added to various components of a computer system may be aggregated for use in automatically storing backup copies of files. As will be understood, the various block diagrams, flow charts and scenarios described herein are only examples, and there are many other scenarios to which the present invention will apply.

Figure 2:
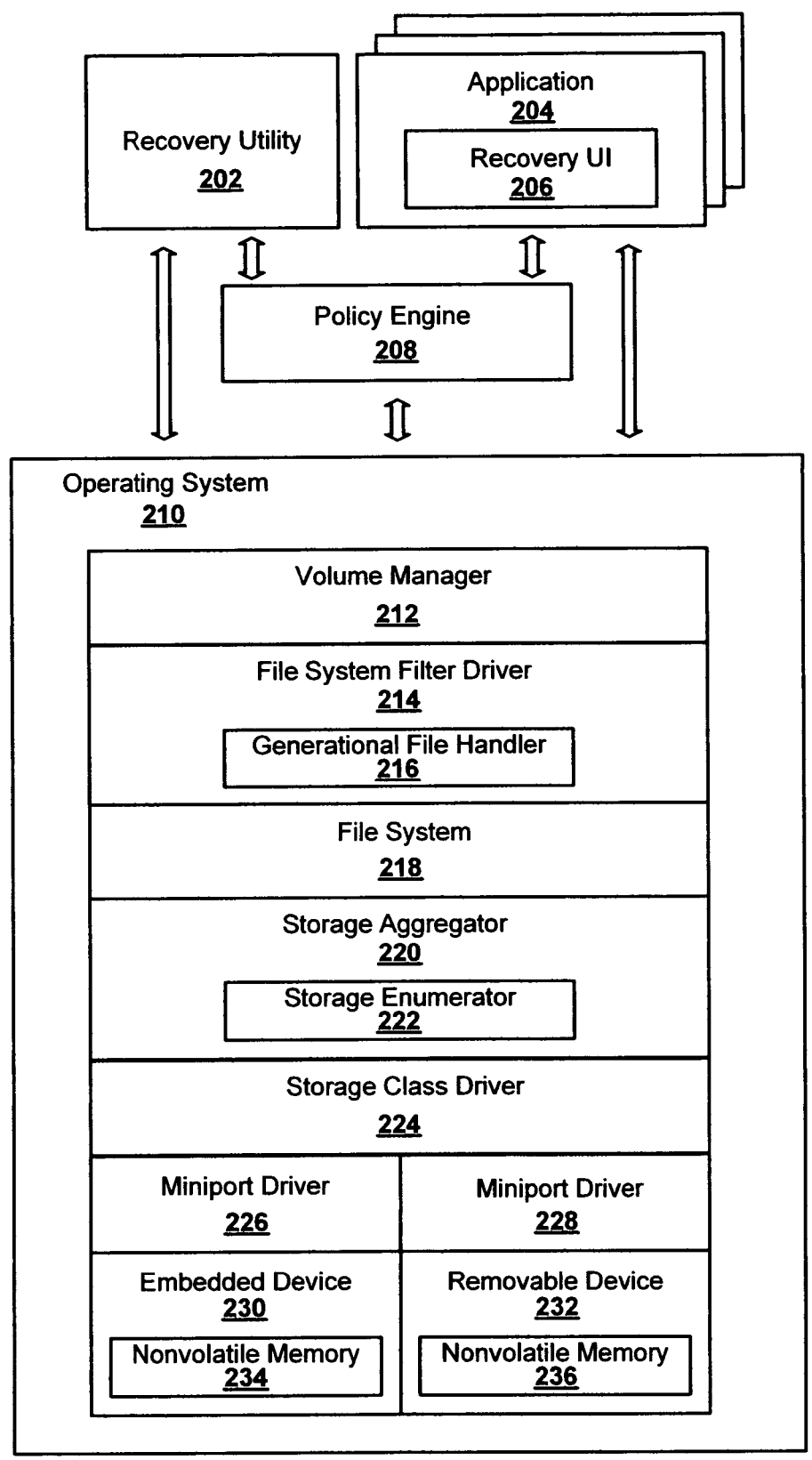
FIG. 2 is a block diagram generally representing an exemplary architecture of system components in one embodiment for using a file system to automatically backup a file in persistent storage, in accordance with an aspect of the present invention.

Turning to FIG. 2 of the drawings, there is shown a block diagram generally representing an exemplary architecture of system components in one embodiment for using a file system to automatically backup a file for saving working data in persistent storage. Those skilled in the art will appreciate that the functionality implemented within the blocks illustrated in the diagram may be implemented as separate components or the functionality of several or all of the blocks may be implemented within a single component. As an example, the functionality of the file system filter driver 214 may be included within file system 218. Or the generational file handler 216 may be implemented in a separate component from the file system filter driver 214.

One or more application programs 204 shown in FIG. 2 may be operably coupled to a policy engine 208 and an operating system 210. Each application 204 may be executable software code for performing any number of operations with data that a user of the computer system may wish to persist. For example, the application may perform word processing operations, spreadsheet operations, drawing operations, or other operations with data. The policy engine 208 may be operably coupled to one or more applications 204, a recovery utility 202, and the operating system 210. The policy engine 208 may be any executable software code including a kernel component, an application component, a component of a linked library, an object, and so forth. The policy component 208 may include one or more policies that may be used to determine what data may be automatically backed up by using the file system for saving the data in persistent storage. In one embodiment, the policy component 208 may include one or more policies that may be used to determine where the data should be backed up. For instance, a policy may provide instructions for backing up data automatically by using the file system to store the data either in embedded nonvolatile memory, in removable nonvolatile memory, in a computer storage medium such as a hard drive, or in a combination of nonvolatile memory and/or other computer storage media.

The operating system 210 may generally include a file system and one or more devices that may have accessible persistent storage. More specifically, the operating system 210 in one embodiment may include operably coupled components such as a volume manager 212, a file system filter driver 214, a file system 218, a storage aggregator 220, a storage class driver 224, one or more miniport drivers such as miniport drivers 226 and 228, and one or more devices such as embedded device 230 and removable device 232. The volume manager 212 may provide functionality for creating and managing volumes that may be simple, such as a volume for a logical drive formatted for a particular file system on a partition of a storage device, or that may be spanned or striped across multiple storage media that may include nonvolatile memory.

The file system filter driver 214 may provide functionality for receiving a request to save a file from an application and may instruct the file system to save a backup copy of the file. In an embodiment, the file system filter driver 214 may access a policy, for instance provided by the policy engine 208, which may specify whether a backup copy of the file should be created and where the backup copy, if created, should be stored. In various embodiments, the file system filter driver may instruct the file system to store a backup copy of the file either in embedded nonvolatile memory, in removable nonvolatile memory, in a computer storage medium such as a hard drive, or in a combination of nonvolatile memory and/or other computer storage media. The file system filter driver 214 may include a generational file handler that may create and manage a set of generational files as backup copies of a particular application file. Each generational file in the set may include an attribute, which may uniquely identify that copy of the file, as part of the file name. In an embodiment, the file system filter driver 214 may create a generational file as a backup copy of an application file and instruct the file system where to store the generational file.

The file system 218 may be any type of file system that may receive a request to store a file as part of a volume. In an embodiment, the file system 218 may receive a request to store both an application file and a backup copy of the application file. The request for storing the backup copy may specify how to store the backup copy. For example, the file system 218 may be requested to store the backup copy on a volume that may have physical storage that uses mirroring, striping, or may be configured using RAID or SAN.

The storage aggregator 220 may provide functionality for enumerating and organizing persistent storage available in the computer system. The storage aggregator 220 may include a storage enumerator that may identify and list available persistent storage that may be used by the file system for saving a backup copy of an application file. In one embodiment, persistent storage that may be available in the computer system may be aggregated to form a volume that may be used to store files on one or more physical devices that may deploy any number of storage techniques including mirroring, striping, or may be configured using RAID or SAN. The storage aggregator 220 may aggregate persistent storage or portions of persistent storage at boot time or whenever additional persistent storage may be made accessible to the computer system.

To communicate with physical devices, a storage class driver 224 may include functionality for sending a file, or part of a file, to a miniport driver and for receiving a file, or part of a file, from a miniport driver. A miniport driver may, in turn, provide functionality to communicate with a device such as miniport driver 226 configured to communicate with an embedded device such as embedded device 230 having nonvolatile memory 234. There may be any number of different types of embedded devices that may include persistent storage that may be used by the file system for saving a backup copy of an application file. For example, nonvolatile memory may be plugged into a motherboard or south bridge, into an embedded hard drive or disk controller for an embedded hard drive, or may be operably coupled in other embedded components and controllers in a computer system. As used herein, an embedded device means any device or component of a computer system, including, without limitation, a motherboard, a controller, or peripheral device. In addition to embedded devices, a miniport driver such as miniport drivers 228 may be configured to communicate with a removable device such as removable device 232 having nonvolatile memory 236. There may also be any number of different types of removable devices that may include persistent storage that may be used by the file system for saving a backup copy of an application file. For example, Universal Serial Bus (USB) flash drive (UFD), digital media such as Secure Digital, CompactFlash, MemoryStick, and other removable media may provide persistent storage that may be used to store a backup copy of an application file or part of an application file. Embedded and removable devices may include, without limitation, these examples that may provide disparate caches of persistent storage that may be aggregated to provide a uniform storage that may be used by the file system to automatically save a backup copy of an application file.

Once a backup copy of an application file may be created and saved by the file system, a user interface may be provided for recovering one or more backup copies of the application file in the event of loss or corruption of the application file, which may have been stored by the system, for instance, on rotating media that may have experienced catastrophic failure. A generic tool, such as recovery utility 202, may be provided in an embodiment for recovery of backed up files. Or a tool for a specific application, such as recovery user interface 206 operably coupled to application 204, may be provided in various embodiments. Recovery user interface 206 may be part of a common dialog presented to a user for opening files. Such a common dialog may be extended with an action to recover backup application files. For instance, a system query may be made for an application file and the recovery user interface may use the namespace of the file to retrieve one or more backup copies, such as the set of generational files, for inspection by a user to recover whatever copy of the file may be desired by the user. In other embodiments, a recovery utility may run as part of reading the directory of an installed removable memory device such as a UFD that may recognize that the installed device may contain backup files stored by another machine. The recovery utility may then present the backup copies to the user to recover any available copy of the file.

Those skilled in the art will appreciate that the exemplary architecture of system components shown in FIG. 2 may be but one exemplary embodiment for practicing the present invention and that other computing system configurations may be used to implement the present invention. For example, a computing system may not be configured to include a storage aggregator, yet the file system may be configured to create and store a backup copy of an application file on one or more devices with persistent storage, such as a removable device, whenever the file system may receive a request from an application to save or close the application file. As another example, removable media may include firmware for exchanging secure credentials before backed up files stored on the removable media may be accessed, modified or deleted. In one embodiment, there may be a public and private area of persistent storage on the removable media and the private area may be made accessible after a successful credential exchange. In yet another example, backup files stored in the persistent storage of the computer system may additionally be saved opportunistically to other devices or computer systems that may be connected by a wireless or wired network, such as a remote computer 180 or memory device 181 illustrated in FIG. 1. In this way, a tranactional system may be implemented including using nonvolatile caching to the network. In one embodiment, the location of a backup file may also be included in the file system information of the backup copies so that a file may be located when it synchronizes to such a remote storage device or system for recovery of an application file.

Figure 3:
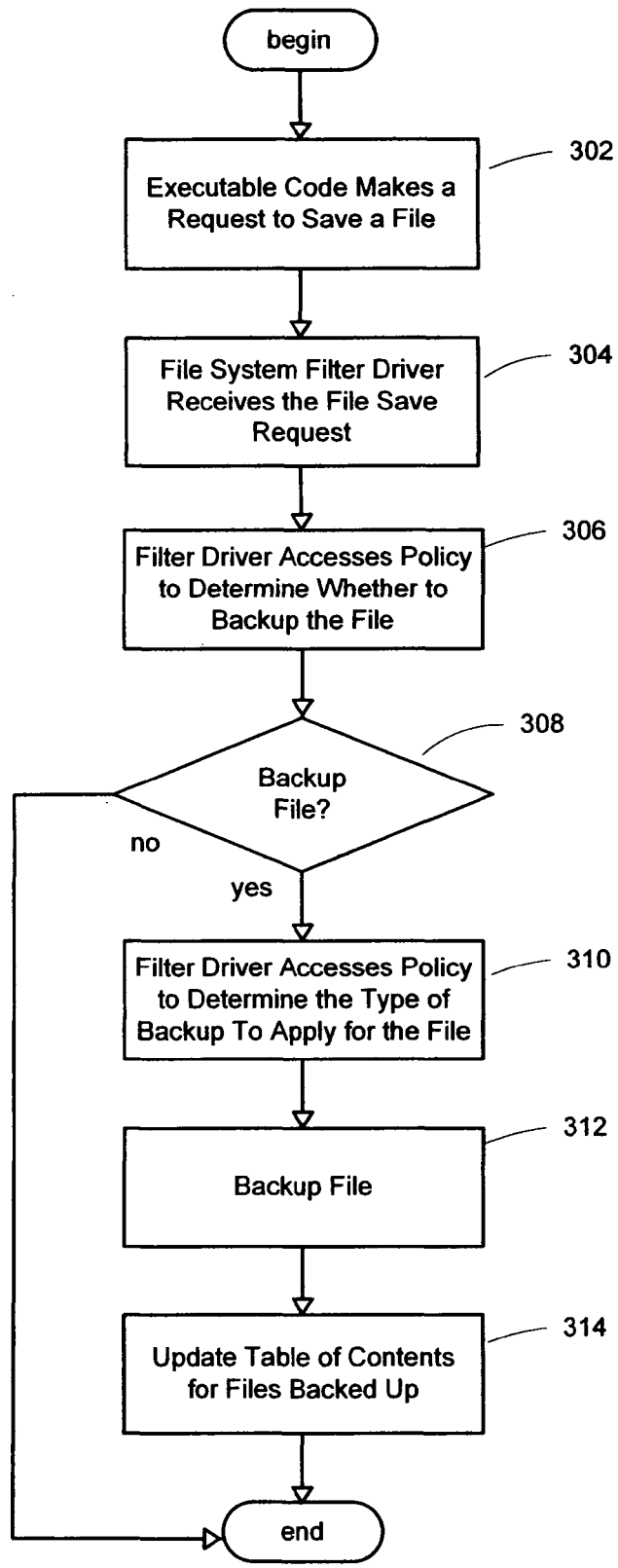
FIG. 3 is a flowchart generally representing exemplary steps undertaken in one embodiment for using a file system to automatically backup a file in persistent storage, in accordance with an aspect of the present invention.

FIG. 3 presents a flowchart generally representing exemplary steps undertaken in one embodiment for using a file system to automatically backup a file for saving working data in persistent storage. Those skilled in the art will appreciate that an implementation may choose to perform these steps in a different order or may choose to perform only some of these steps for purposes of efficiency or flexibility, while achieving the same effect and without departing from the scope of the present invention. At step 302, a request may be made by executable code to save a file. In one embodiment, the request may be made by an application, such as application 204, to save an application file. A file system filter driver may receive the request to save the application file at step 304. In an embodiment, a file system filter driver such as file system filter driver 214 may monitor requests for file system services such as save, close, or write requests for an application file.

A file system filter driver may then access a policy at step 306 to determine whether to backup the file. In one embodiment, a policy may be used to determine what data may be automatically backed up. For example, files for some applications may not be backed up. A policy may, for instance, specify that a backup should be made for a word processing file but not for an email application. A policy may accordingly choose files to backup based upon attributes or metadata of a file including file type, file name, directory name, directory location, and so forth. Any attribute of a file may be specified for use in choosing files to backup. Any metadata may be used, including user-defined metadata. A policy may also specify how much storage space may be used, how much storage space should be kept free, the maximum number of files that may be backed up, and may specify which files may have precedence over others for storing backup copies in the available storage space. For example, a policy may specify that a backup copy of most recently accessed files may have precedence for storage space available over backup copies of least recently accessed files. As another example, a policy may specify that the most recent backup copies of currently open files be stored on a removable device with persistent storage such as a UFD device.

At step 308, it may be determined from the policy whether a backup of the file should be made. If not, then processing may be finished and a backup may not be made for the file. If it may be determined at step 308 that a backup of the file should be made, then a file system filter driver may then access a policy at step 310 to determine the type of backup to apply for the file. In one embodiment, a generational file may be created as a backup copy of the file. In various embodiments, the file system filter driver may instruct the file system where to store a backup copy of the file, for instance, either in embedded nonvolatile memory, in removable nonvolatile memory, in a computer storage medium such as a hard drive, or in a combination of nonvolatile memory and/or other computer storage media. Then the file may be backed up at step 312. And at step 314, the table of contents for files that have been backed up may be updated.

Figure 4:
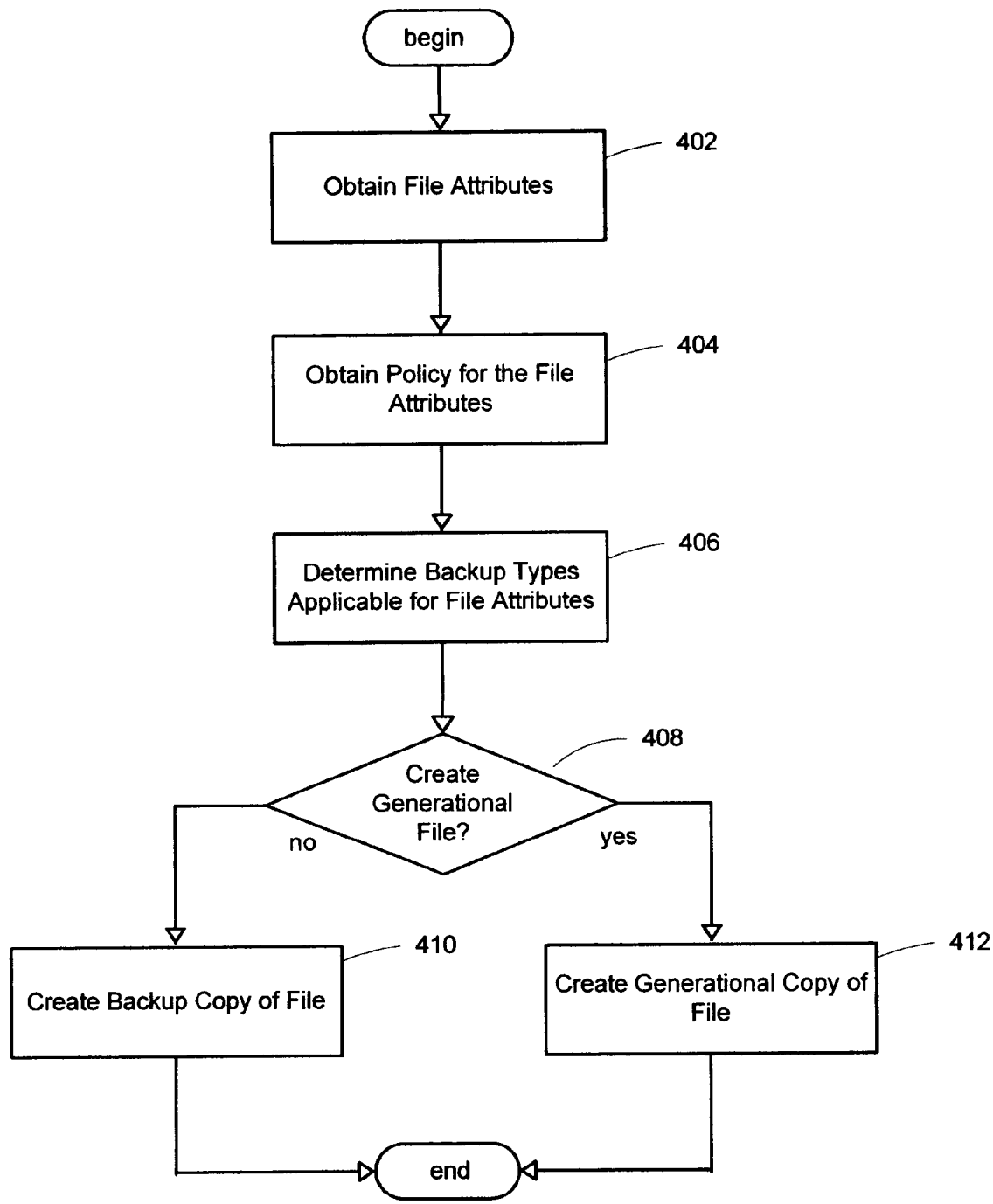
FIG. 4 is a flowchart generally representing exemplary steps undertaken in one embodiment for determining the type of backup to apply to a file using a file system to automatically backup a file in persistent storage, in accordance with an aspect of the present invention.

FIG. 4 presents a flowchart generally representing exemplary steps undertaken in one embodiment for determining the type of backup to apply to a file using a file system to automatically backup a file in persistent storage. At step 402, attributes associated with the file may be obtained. Such attributes may include file type, file name, directory name, directory location, and so forth. Any attribute of a file may be specified for use in determining the type of back up to apply to the file. At step 404, one or more policies for the attributes of the file may be obtained. The type of backup to be applied to the file may then be determined at step 406. For example, the policy may specify that the backup copy should be mirrored, striped or stored using RAID. As another example, the policy may specify that the backup file should be stored in a hidden volume so that the backup file is not visibly displayed through a user interface to a user.

In one embodiment, the policy may specify that a generational file should be created as a backup copy. Each generational file in a set of generational files may include an attribute, which may uniquely identify that copy of the file, as part of the file name. For example, a file name may be appended with a suffix including one or more attributes such as the volume, the date, time of creation, cyclic redundancy code (CRC) or other attributes that serve to create a unique signature for that copy of the file. The naming of a generational file may also be extensible for adding attributes that may be unique to the application or the user's needs. In an embodiment, a policy for a generational data set may specify one or more generational files to be created and persistently stored.

At step 408, it may be determined whether a generational file should be generated as a backup copy of the application file. In one embodiment, a policy may specify that a generational file should be made as a backup copy. If not, then a copy of the application file may be made as a backup copy of the file at step 410. If it may be determined that a generational file should be made as a backup of the file, then a generational file may be made at step 412. After either a copy of the file or a generational file may be made as a backup copy, processing may be finished.

Once a backup copy of an application file may be created and saved by the file system, a user interface may be provided for recovering one or more backup copies of the application file in the event of loss or corruption of the application file that may have been persistently stored. A generic tool, such as recovery utility 202, may be provided in an embodiment for recovery of backed up files. Or a tool for a specific application, such as recovery user interface 206 operably coupled to application 204, may be provided in various embodiments. In various embodiments, a directory that may have the backup copies may be protected from being accidently overwritten. For example, access to a backup directory may be restricted to a recovery utility or to the policy engine.

Figure 5:
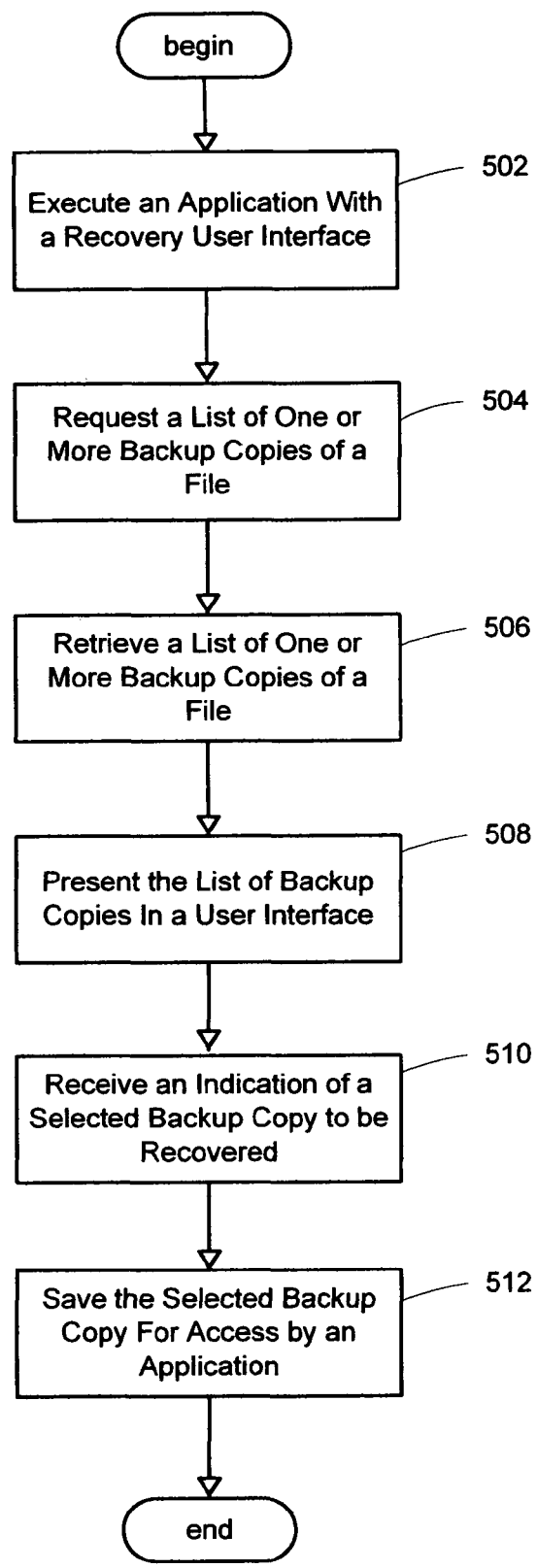
FIG. 5 is a flowchart generally representing exemplary steps undertaken in one embodiment for recovering a backup file created using a file system to automatically backup the file in persistent storage, in accordance with an aspect of the present invention.

FIG. 5 presents a flowchart generally representing exemplary steps undertaken in one embodiment for recovering a backup file created using a file system to automatically backup the file in persistent storage. At step 502, an application with a recovery user interface may be executed for recovery of a backup file. A recovery user interface 206 may be included in an application or a recovery utility. In one embodiment, the recovery user interface may be part of a common dialog presented to a user for opening files. Such a common dialog may be extended with an action to recover backup application files. At step 504, a list of one or more backup copies of the file may be requested and then retrieved at step 506. For instance, a system query may be made for an application file in an embodiment and the recovery user interface may use the namespace of the file to retrieve a list of one or more backup copies, such as the set of generational files.

At step 508, the list of backup copies of the file may be presented in a user interface for inspection by a user to recover whatever copy of the file may be desired by the user. At step 510, an indication of a selected backup copy to be recovered may be received. At step 512, a selected backup copy may be persistently saved for access by an application.

Figure 6:
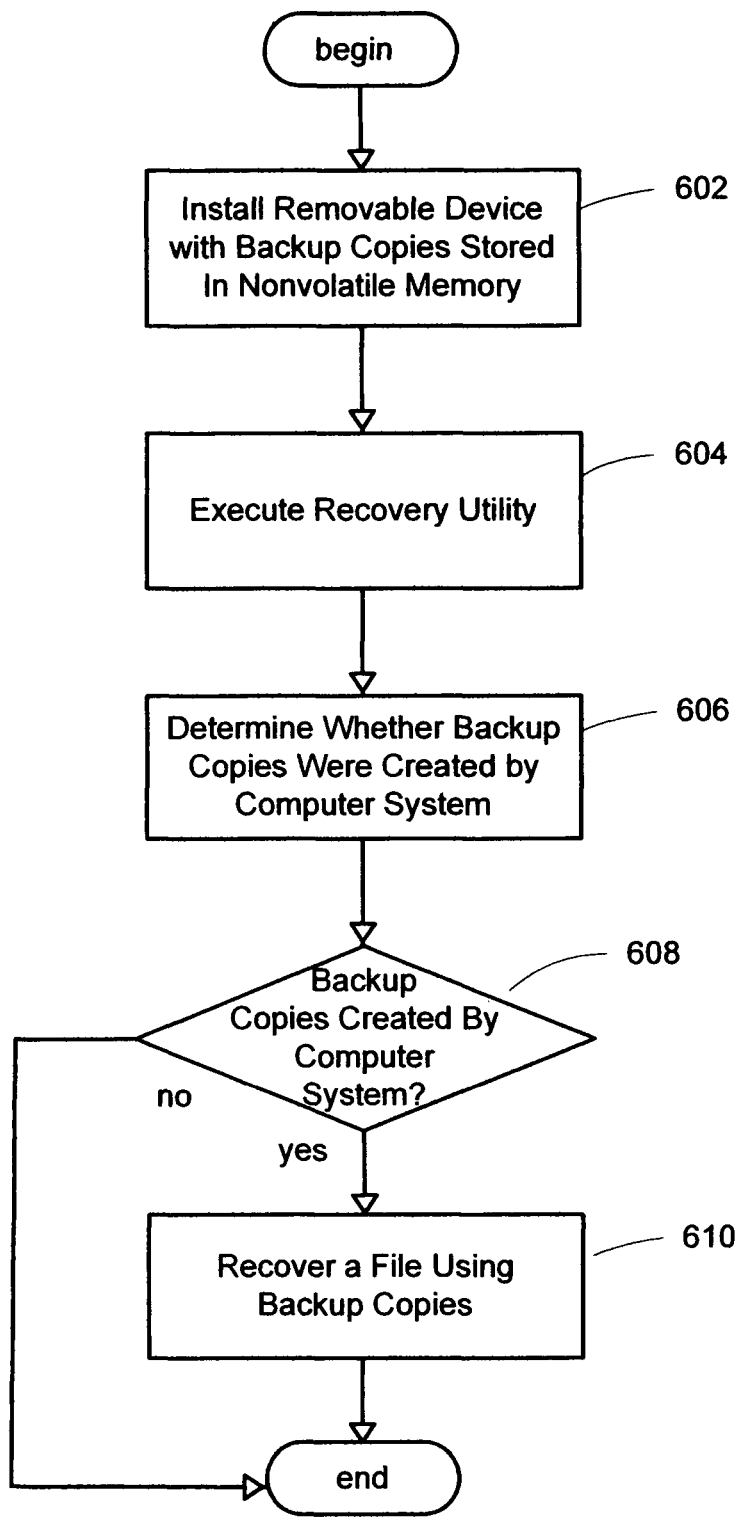
FIG. 6 is a flowchart generally representing exemplary steps undertaken in another embodiment for recovering a backup file created using a file system to automatically backup the file in persistent storage, in accordance with an aspect of the present invention.

In other embodiments, a recovery utility may run as part of reading the directory of an installed removable memory device such as a UFD. In reading the directory, the recovery utility may recognize that the installed device may contain backup files stored by another machine. The recovery utility may then present the backup copies to the user to recover any available copy of the file. FIG. 6 presents a flowchart generally representing exemplary steps undertaken for such an embodiment for recovering a backup file stored on an installed removable memory device.

At step 602, a removable device with backup copies stored in persistent storage may be installed in a computer system. For example, a UFD having backup copies may be plugged into a USB port and the computer system may install the UFD. At step 604, a recovery utility may be executed. In one embodiment, a recovery utility may be stored on the device along with the backup copies. The recovery utility may be discovered during installation and executed. At step 606, it may be determined whether the backup copies were created by the computer system that installed the removable device. In one embodiment, a directory of the backup files written to the device may store an identification of the computer system that stored the backup files on the device. The identification may be any attribute of the computer system that may serve to identify it, such as the processor ID or the MAC address of the computer system.

If it may be determined at step 608 that the computer system may not have created the backup files, then processing may be finished. For instance, the recovery application may close itself. Otherwise, if it may be determined at step 608 that the backup copies were created by the computer system that installed the removable device, then a file may be recovered at step 610 by using steps 504-512 of FIG. 5 as previously described. One or more backup copies of the file may be requested as described at step 504 and then retrieved as described at step 506. The backup copies of the file may then be presented in a user interface as described at step 508 for inspection by a user to recover whatever copy of the file may be desired by the user. An indication of a selected backup copy to be recovered may be received as described at step 510, and a selected backup copy may be persistently saved for access by an application as described at step 512.

In this way, a file system may be used to automatically recover a backup copy for an application that may be stored on a device with persistent storage. Any accessible persistent storage that may be added to various components of a computing system may be aggregated for use in storing backup copies of files. For example, a hard drive manufacturer may augment a drive controller with a large chunk of nonvolatile memory that may be used while a hardrive may be spinned down to save energy. By using such persistent storage, the present invention may take advantage of inflections occurring in hardware as increased persistent storage may be added to the system including to devices and device controllers.

As can be seen from the foregoing detailed description, the present invention provides an improved system and method for using a file system to automatically backup a file in persistent storage. Transparently to applications, automatic backup copies of a file may be made using generational data files. Advantageously, an application does not need to be modified to benefit from this invention. Moreover, the system and method provided is extensible. Any attributes that may be unique to the application or the user's needs may be added in naming a generational file. Any attribute of a file may be used for determining the type of backup that may be applied to a file. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of using a file system to generate backups of data for any of one or more different application programs in response to receiving a request to save the data at a file system filter driver and without requiring user input at the time of the request to save the data that specifically requests that a backup of the data be created, the method comprising:

receiving at the file system filter driver a request generated by a particular application program to save a data file being processed by the particular application program, wherein the operating system of the computing system is operably coupled through the file system filter driver to a policy engine for automatically determining backup policies to be applied to the data processed by one or more different application programs, and wherein the operating system includes a file system and one or more drivers for accessing either embedded or removable storage;

upon receiving the request to save the data file, the file system filter driver automatically accessing the policy engine and accessing one or more policies which specify:
whether to create a backup copy for the data file,
what type of backup to apply to the data file, and
whether to store the backup copy of the data file, if any, in embedded storage, removable storage, or both; and upon determining that the one or more policies accessed by the file system filter driver require making a backup copy for the data file, the operating system thereafter controlling the one or more drivers in order to store a backup copy of the data file for the particular application program in accordance with the one or more policies.

2. The method of claim 1 wherein the file system filter driver includes a generational file handler for creating and managing a set of generational files as backup copies for a data file of the one or more application programs, and wherein the step for controlling the one or more drivers in order to store the backup copy of the data file for the particular application program in accordance with the one or more policies is comprised of creating at least one generational backup copy of the data file that is different from a previously stored version of the data file, and persistently storing both versions.

3. A method as defined in claim 1 wherein the operating system further includes a storage aggregator for enumerating and organizing persistent storage devices available in the computing system, the storage aggregator having a storage enumerator that identifies and lists available persistent storage that may be used by the file system for saving a backup copy of a data file, and wherein the step for controlling the one or more drivers in order to store the backup copy of the data file for the particular application program in accordance with the one or more policies is comprised of aggregating the persistent storage available in the embedded and removable storage memory in order to form a volume that may be used to store the backup copy of the data file on any or all of the available embedded and removable storage memory.

4. The method of claim 1 further comprising obtaining one or more file attributes of the data file and determining the types of backup applicable to the one or more file attributes.

5. The method of claim 3 wherein storing the backup copy of the data file comprises persistently storing at least part of the backup copy of the file on one or more computer readable media of the computer system that have been aggregated to include nonvolatile memory in the computer system for storing the backup copy of the data file.

6. The method of claim 5 further comprising updating a table of contents that includes the at least part of the backup copy of the data file persistently stored on the one or more computer readable media.

7. The method of claim 5 wherein storing at least part of the backup copy of the data file on one or more computer readable media of the computer system that have been aggregated to include nonvolatile memory in the computer system for storing the backup copy of the file comprises persistently storing at least part of the backup copy of the data file on removable storage memory operably coupled to the computer system.

8. The method of claim 2, further comprising steps for:
executing an application with a recovery user interface to recover a generational file persistently stored as a backup copy of the data file;
sending a request to obtain a list of one or more generational files created as backup copies of the data file;
retrieving the list of the one or more generational files created as backup copies of the data file;
presenting the list of the one or more generational files created as backup copies of the data file in a user interface;
receiving an indication of a generational file selected from the list as the backup copy to be restored; and
retrieving the generational file selected as the backup copy to be restored and restoring the generational file selected by persistently storing the selected generational file in a namespace accessible by the particular application.

9. The method of claim 8 wherein executing the particular application with the recovery user interface to recover the generational file persistently stored as the backup copy of the data file comprises installing a removable device having the generational file persistently stored as a backup copy in nonvolatile memory and determining whether the backup copy was created by the computer system.

10. The method of claim 1, wherein whether a backup copy is to be created or not is based at least in part on at least one of an attribute or metadata of the data file.

11. A computer program product comprising a computer storage medium containing computer-executable instructions for implementing within a computing system a method for using a file system to generate backups of data for any of one or more different application programs in response to receiving a request to save the data at a file system filter driver and without requiring user input at the time of the request to save the data that specifically requests that a backup of the data be created, the method comprising:
receiving at the file system filter driver a request generated by a particular application program to save a data file being processed by the particular application program, wherein the operating system of the computing system is operably coupled through the file system filter driver to a policy engine for automatically determining backup policies to be applied to the data processed by one or more different application programs, and wherein the operating system includes a file system and one or more drivers for accessing either embedded or removable storage;
upon receiving the request to save the data file, the file system filter driver automatically accessing the policy engine and accessing one or more policies which specify:
whether to create a backup copy for the data file,
what type of backup to apply to the data file, and
whether to store the backup copy of the data file, if any, in embedded storage, removable storage, or both; and
upon determining that the one or more policies accessed by the file system filter driver require making a backup copy for the data file, the operating system thereafter controlling the one or more drivers in order to store a backup copy of the data file for the particular application program in accordance with the one or more policies.

12. The computer program product of claim 11 wherein the file system filter driver includes a generational file handler for creating and managing a set of generational files as backup copies for a data file of the one or more application programs, and wherein the step for controlling the one or more drivers in order to store the backup copy of the data file for the particular application program in accordance with the one or more policies is comprised of creating at least one generational backup copy of the data file that is different from a previously stored version of the data file, and persistently storing both versions.

13. The computer program product of as defined in claim 11 wherein the operating system further includes a storage aggregator for enumerating and organizing persistent storage devices available in the computing system, the storage aggregator having a storage enumerator that identifies and lists available persistent storage that may be used by the file system for saving a backup copy of a data file, and wherein the step for controlling the one or more drivers in order to store the backup copy of the data file for the particular application program in accordance with the one or more policies is comprised of aggregating the persistent storage available in the embedded and removable storage memory in order to form a volume that may be used to store the backup copy of the data file on any or all of the available embedded and removable storage memory.

14. The computer program product of claim 11 wherein the method implemented by the computer-executable instructions further comprises obtaining one or more file attributes of the data file and determining the types of backup applicable to the one or more file attributes.

15. The computer program product of claim 11 wherein the method implemented by the computer-executable instructions further comprises updating a table of contents that includes the at least part of the backup copy of the data file.

16. The computer program product of claim 13 wherein the method implemented by the computer-executable instructions further comprises steps for:

executing an application with a recovery user interface to recover a backup copy of the data file stored on the storage memory that has been aggregated;

sending a request to obtain a list of one or more backup copies of the data file;

retrieving the list of the one or more backup copies of the data file;

presenting the list of the one or more backup copies of the data file in a user interface;

receiving an indication of a backup copy selected from the list to be restored; and retrieving the selected backup copy from the storage memory that has been aggregated and restoring the selected backup copy by persistently storing the selected backup copy in a namespace accessible by the particular application.

17. The computer program product of claim 16 wherein executing the particular application with the recovery user interface to recover the backup copy of the data file comprises installing a removable storage memory having backup copies stored in nonvolatile memory and determining whether the backup copies were created by the computer system.

18. The computer program product of claim 11, wherein whether a backup copy is to be created or not is based at least in part on at least one of an attribute or metadata of the data file.

19. A computer system for making a backup copy of a file, comprising:

executable software code for requesting a file to be persistently stored;

an operating system operably coupled to the executable software code for receiving the request to persistently store the file, the operating system having a file system filter driver that, upon receiving the request to persistently store the file, determines whether to create a backup copy of the file and determines the type of backup to apply for the file, wherein determining the type of backup comprises:

obtaining attributes associated with the file, obtaining one or more policies for the attributes of the file, determining backup types applicable to the one or more file attributes, and determining whether to create a generational file as a backup copy of the file, and if yes generating a generational file and if not generating a copy of the file as a backup copy;

a generational file handler operably coupled to the file system filter driver for creating a generational file as the backup copy of the file;

a file system operably coupled to the file system filter driver for persistently storing the backup copy of the file; and a storage aggregator operably coupled to the file system for aggregating persistent storage, including nonvolatile memory, in the computer system used for storing the backup copy of the file.

20. The system of claim 19, wherein whether to create a generational file as a backup copy of the file is based at least in part on at least one of an attribute or metadata of the data file.

* * * * *